United States Patent [19]

Brandes

[11] 4,045,850
[45] Sept. 6, 1977

[54] ROLLING PIN WITH DOUGH THICKNESS CONTROL

[76] Inventor: Guenther Brandes, 3 Wilson Ave., Camden, Maine 04843

[21] Appl. No.: 640,755

[22] Filed: Dec. 15, 1975

[51] Int. Cl.² .............................................. B05C 1/08
[52] U.S. Cl. ..................................................... 29/111
[58] Field of Search ...................... 29/110.5, 111, 112, 29/116 R, 132

[56] References Cited

U.S. PATENT DOCUMENTS

| 353,177 | 11/1886 | Taylor | 29/111 X |
| 2,339,492 | 1/1944 | Lewis | 29/116 R |
| 3,918,775 | 11/1975 | Lehmann | 29/111 X |

FOREIGN PATENT DOCUMENTS 1,066,962  10/1959  Germany ............................ 29/110.5

*Primary Examiner*—Wayne L. Shedd
*Attorney, Agent, or Firm*—Wilfred S. Stone

[57] ABSTRACT

The invention is a pin for rolling dough to variable thicknesses, the variability being under immediate control by the baker. The pin carries a rotatable gage permanently mounted on the roller in such a way that the baker can almost instantly vary the thickness of the dough that he is about to roll without substituting elements on the rolling pin and/or altering the relationship of the physical elements on the rotatable gage that make the variable thickness of the dough possible.

4 Claims, 3 Drawing Figures

U.S. Patent       Sept. 6, 1977       4,045,850
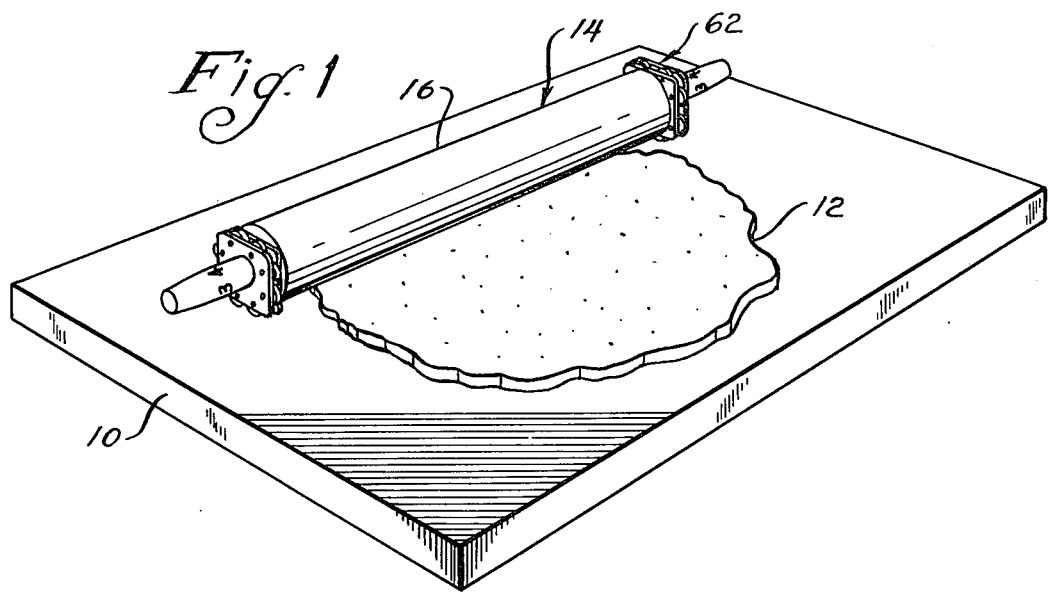
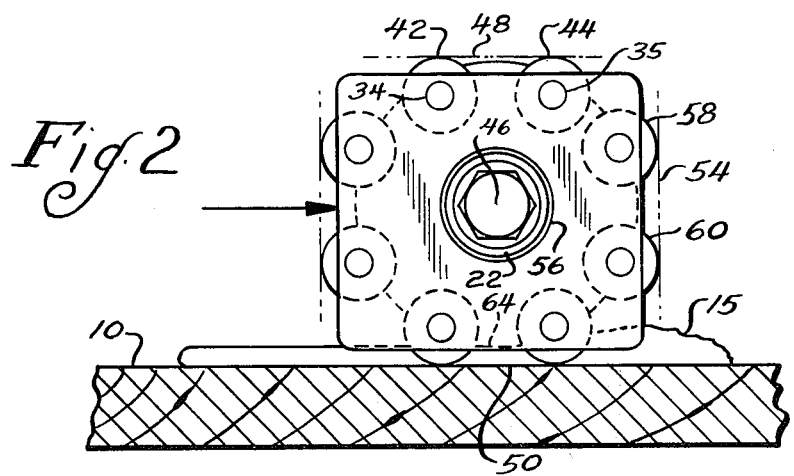
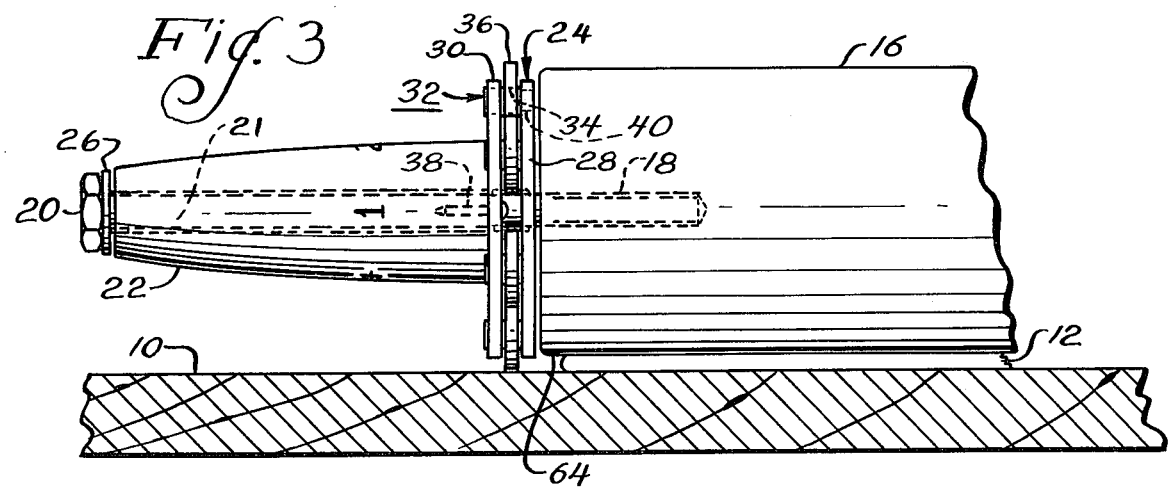

ROLLING PIN WITH DOUGH THICKNESS CONTROL

BACKGROUND OF THE INVENTION

This invention relates to a rolling pin which is useful to a baker who is required to roll various thicknesses of dough for cookies, bread, rolls, etc., which need not be ready for consumer use for hours. More importantly, in the present economy, it is useful to the maker of pizza pies working at a short order counter for making various types of pizza, the most popular of which employs a rather thin crust, while bread pizzas utilize a very thick crust. At the short order counter there is no time to change an element on a rolling pin to go from a thin sheet of dough to a thicker sheet. What is wanted is a rolling pin for the pizza maker which he can pick up by one handle and as he moves it over the dough he can adjust a gauge on the handle of the rolling pin to provide him with the thickness of dough for the particular pizza he is about to make.

This invention relates to two like, adjustable gages, one mounted on one handle of the rolling pin and the other mounted on the other handle of the rolling pin. The particular embodiment shown in this application has gages which are designed to give four different thicknesses of dough. The handles themselves carry four digits (1-4), and since they are freely rotatable on the shaft of the rolling pin itself, the baker simply turns the rotatable gauge on the right hand handle to, for example, the digit 3, to align it with the digit 3 on the left hand handle. The rolling pin will then produce a sheet or layer of dough of uniform thickness.

SUMMARY OF THE INVENTION

The principle object which is accomplished in this invention is to provide a baker with a substantially instantaneous means of varying the thickness of the dough which he wishes to roll.

Another object of the invention is to provide a variable gage permanently mounted on the respective handles of the rolling pin, which gage can be readily cleaned.

Another object of the invention is to provide means for the baker to maintain any particular gage in contact with the surface of the dough board by hand pressure alone.

This is accomplished by forming on the periphery of the gage two spaced rollers mounted on axes which are equally spaced from and parallel to the axis of the rolling pin. Rocking on the surface of the board is easily avoided because of these two points of engagement with the board by the two spaced rollers on the gage.

DESCRIPTION OF THE DRAWINGS

In the drawings, which are to be read in conjunction with the description of the invention that follows:

FIG. 1 is a perspective view of the rolling pin with dough thickness control in engagement with a dough board and showing a sheet of dough formed after the rolling pin has passed over.

FIG. 2 is an end elevation of the roller gage with portions of the gage and board shown in section; and FIG. 3 is a side elevation of one end of the rolling pin, the variable gage and one handle.

DESCRIPTION OF A PREFERRED EMBODIMENT

Referring to FIG. 1 the numeral 10 identifies a board for rolling dough upon which lies a sheet of dough 12 which has been flattened out by the rolling pin 14 which is the subject of this invention. The baker started with a ball of dough 15. The rolling pin 14 consists of a wooden cylinder 16 having recesses 18 axially in each end (see FIG. 3), into which is screwed or press fitted a bolt 20 upon which is rotatably mounted a handle 22. Each handle 22 carries a rotatable gage 24 rigidly fastened to the handle 22. The handle 22 with gage 24 is free to rotate around the shaft of the bolt 20, there being a washer 26 between the end of the handle 22 and the head of the bolt 20. The rotatable gage 24 consists of two plates 28 and 30. The plate 30 has pressed into it eight pins such as 32, each with a bearing 34 projecting from the side away from the handle 22. The pin has reduced bosses 40 on the outer end. Slipped onto each pin is a freely rotatable roller, such as 42 and 44, the clearance between the roller and the bearing being substantial, so that it may be readily cleaned by water. The plate 30 is affixed to the handle 22 by one or more nails such as 38.

The second plate 28 is mounted on the bosses 40 of the pins 32 of the first plate by being press fitted thereon. The two plates are first assembled with the handle 22 and then the shaft 21 of the bolt 20 is inserted into the cylinder 16.

Referring to FIG. 2 each pair of the bearings, such as 34 and 35, are spaced at equal but different radial distance from the axis 46 of the rolling pin as the other three bearing pairs. Thus the tangent 48 to the rollers 42 and 44 is spaced from the axis 46 by a distance, for example, of 14/16 inch, while the distance from the axis 46 of the tangent 50 of flat surface of the board 10 is 15/16 inch. Similarly, the tangent 54 is spaced from the axis 46 by the distance of 17/16 inch. Thus, by rotating the gage, the four positions will produce sheets of dough which will vary in increments of 1/16 inch from each other. While the disclosed embodiment accomplishes this thickness control by varying the radial distances of the bearing pairs from the axis 46 of the rolling pin, the same effect could be achieved by varying the diameters of each of the roller pairs, per se, or in combination with such radial distance variation.

Importantly for the fast use of this rolling pin, are the indicator digits. The indicator digits are shown in part in FIGS. 1 and 3, on handle 22, with indicator digits 3 and 4 shown in FIG. 1 and indicator digit 1 shown in FIG. 3. The four digits 1, 2, 3, and 4 are spaced 90° from each other around the handle 22. The same relationship is established in other rotatable gage 62. In use, as shown in FIG. 1, these indicator digits are in alignment. This is done by the user of the rolling pin and can be done quickly. Pressure on the pairs of wheels hold like figures in alignment and hence the spacing of the surface of the roller 16 remains constant throughout its length.

In use the baker can select whatever thickness he may desire by simply rotating the handles 22 on the cylinder 16. While applicant has shown a rolling pin in which the thickness of the sheet 12 may be varied in increments of 1/16 inch, this can be changed by altering the spacing of the pairs of rollers from the axis. The increments have a base which is the surface of the cylinder shown in FIG. 2 by the dotted line 64 and visible in solid line in FIG.

3. The spacing of the surface of the cylinder 16 and the pair of rollers which are furthest from the axis of the cylinder can be varied by using a different diameter for the cylinder 16.

What is claimed is:

1. A pin for rolling dough flat including means for operation thereof comprising axially and rotatably on each end of the cylinder, gauge means rotatable around the axis of the cylinder and mounted adjacent each end of the cylinder, and having a peripheral portion spaced laterally from the axis of the cylinder, and rotatable means
    comprising two spaced plates having a circular bearing mounted eccentrically with respect to the major axis, and a pair of like diameter rollers mounted adjacent at least one edge with their axes parallel to the major axis and their engaging surfaces equally spaced from the plates.

2. The pin for rolling dough of claim 1 wherein the means rotatable on axes parallel to the axis of the cylindrical roll are a plurality of of pairs of wheels lying in a common transverse plane, each pair having surfaces distinctively spaced from the axis of the cylinder.

3. The pin for rolling dough of claim 1 wherein the means rotatable on axes parallel to the axis of the cylindrical roll are a plurality of pairs of wheels lying in a common transverse plane, each pair having like diameters and distinctively spaced from the axis of the cylinder.

4. The pin for rolling dough of claim 1 wherein each gage is rigidly mounted on each handle.

* * * * *